Jan. 1, 1963  F. W. FULLER  3,070,842
APPARATUS FOR MOLDING PARTICLE BOARDS OF IMPROVED QUALITY
Filed Feb. 26, 1960  2 Sheets-Sheet 1
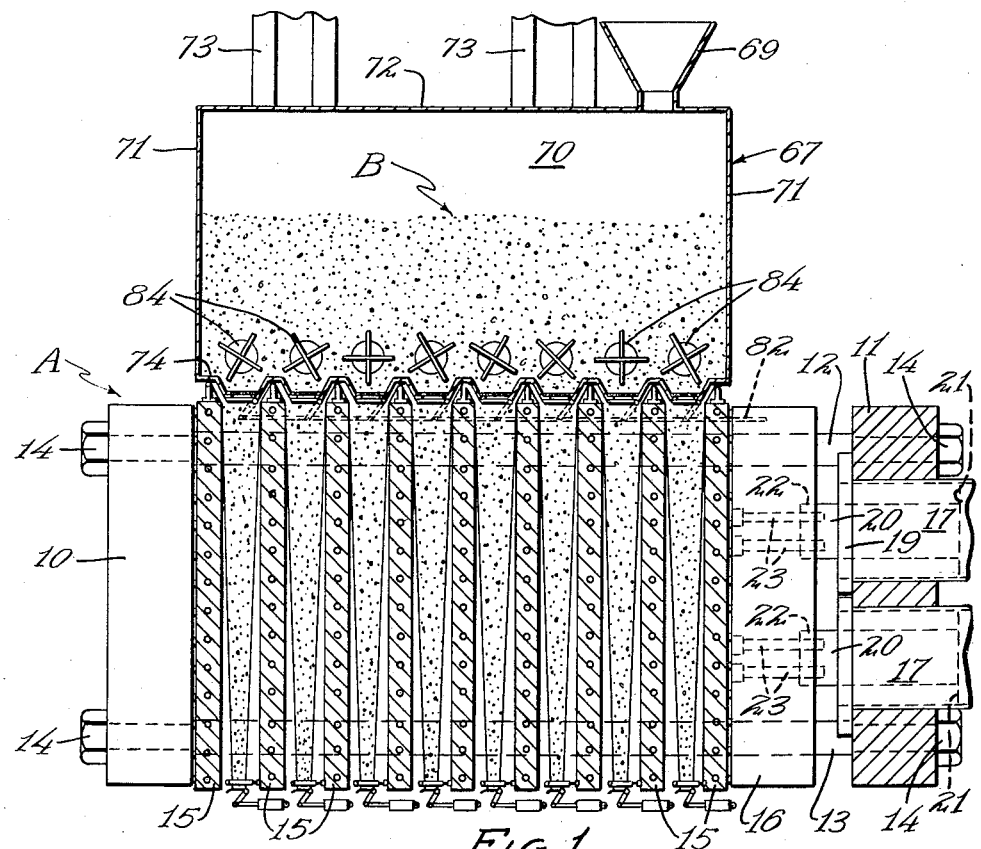
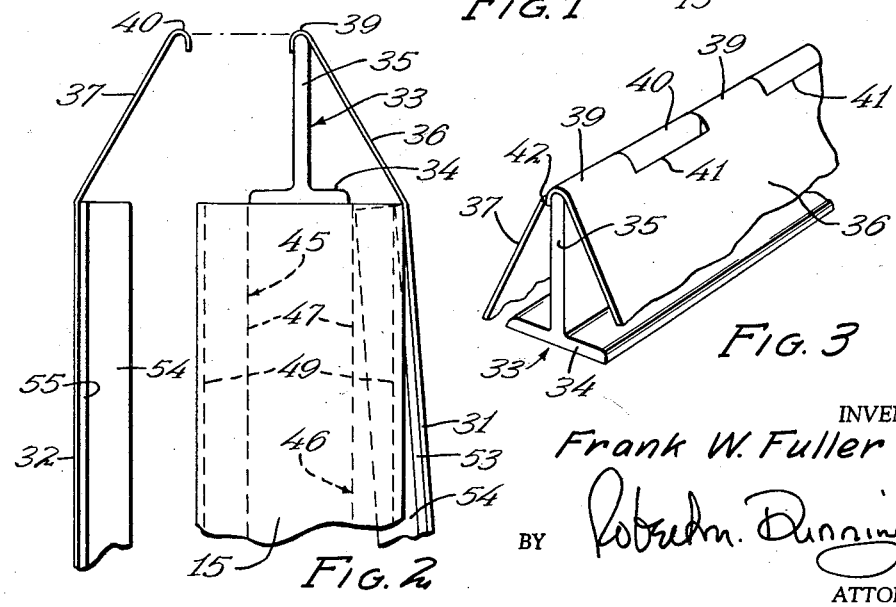
INVENTOR
Frank W. Fuller
BY
ATTORNEY

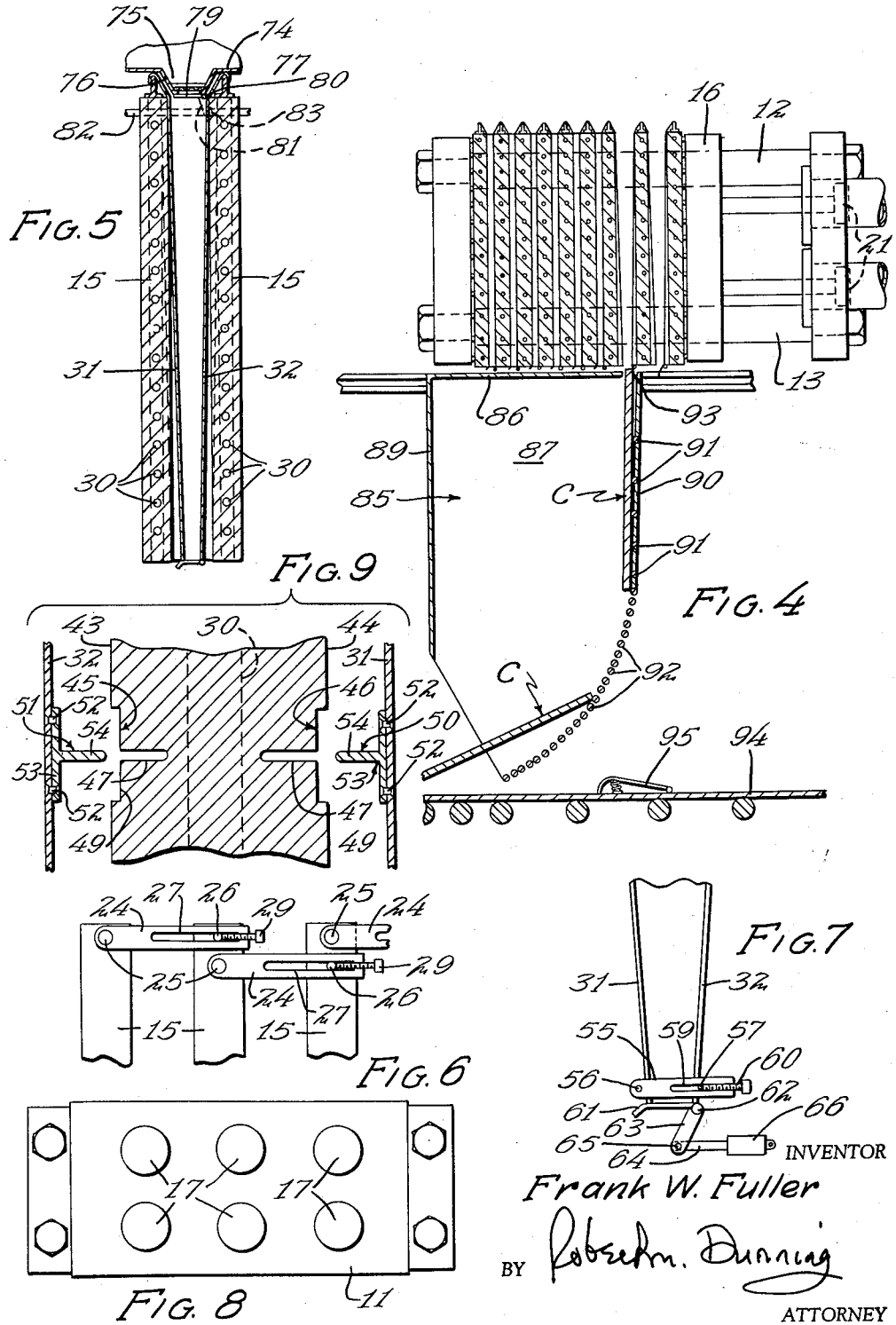

United States Patent Office 3,070,842
Patented Jan. 1, 1963

3,070,842
APPARATUS FOR MOLDING PARTICLE BOARDS
OF IMPROVED QUALITY
Frank W. Fuller, 6507 Royal Crest Drive, Dallas, Tex.
Filed Feb. 26, 1960, Ser. No. 11,231
11 Claims. (Cl. 18—17)

This invention relates to an improvement in quality, and apparatus for molding low cost molding compounds, generally described as being of the compression molding type and usually being a mixture of thermo-setting resins and wood particles, and similar bulky materials. While the apparatus is not limited to such materials, it is particularly adaptable to use with them.

Particle boards are conventionally molded in a production unit including the following major elements: a mixing apparatus, a loading machine, a molding complex, and conveyor means. Additionally, there are metering devices, scales, storage units, dust collectors and other such elements. In general, the mixing apparatus for mixing the resin and the wood particles or the like is well known in the trade. This mixing machine directs the mixture to the loading machine. The loading machine normally includes a hopper which is suspended over a conveyor line and provided at its lower end with an elaborate complicated metering and distributing means for distributing the molding compound as nearly uniformly as possible over the surface of caul sheets moving along the conveyor. The conveyor acts to direct the caul sheets to the molding complex. The molding complex generally consists of three basic units, which are usually hydraulically operable and which are controlled and synchronized by complicated control means. The unit includes a loading elevator having a series of platforms each designed to accommodate a caul sheet and onto which the caul sheets are directed from the incoming conveyor. The molding complex also includes a conventional multiple opening hot plate press having a series of horizontal heated plates equal in number to the platform of the elevator. The molding complex also normally includes an unloading elevator also provided with a series of platforms equal in number to the platforms of the loading elevator and onto which the cauls and molded boards may be directed at the completion of the molding operation. The unloading elevator also normally includes a discharge mechanism for removing the cauls and boards one at a time onto a conveyor. A means is provided for stripping the molded boards from the cauls and directing the caul sheets back to the loading device and directing the molded boards to finishing devices such as trim saws, sanding machines and the like where the boards may be completed.

In operation, the loading elevator receives the caul sheets from the incoming conveyor together with the molding compound spread thereupon, and as each caul sheet moves onto its platform on the elevator, the elevator raises to admit the next caul sheet until the loading elevator is filled. Means is then provided for directing the caul sheets with the compound thereupon onto the heated plates or platens of the press and for removing the caul sheets bearing the previously molded boards to the unloading elevator. After the previously molded boards, with their cauls are removed from the press, and the press recharged, the press is then closed to cure the new load. The loading elevator returns immediately to its starting position and starts collecting a new series of filled cauls. The unloading conveyor moves downwardly a step at a time while the caul sheets and the molded boards are forced one at a time onto the outgoing conveyor.

While the foregoing conventional method has successfully operated for many years, it is subject to certain disadvantages. In the first place, as the molding compound is distributed on the cauls, the "fines" or smaller particles have a tendency to sift through the mass of material to form the lower surface of the board. This action has a tendency to produce an uneven skin stress on the opposite surfaces of the board, causing a tendency to warp the board. Difficulty is also experienced in obtaining an exactly uniform thickness of molding compound throughout the entire area of the caul, causing a variation in the density of the finished board. The uneven distribution of the fines causes a non-uniform surface texture which, in turn presents finishing problems.

While the above difficulties are important, they are minor compared with the problem of uneven application of heat to opposite surfaces of the board. In the conventional process, the loaded cauls are put into the press in direct contact with the tops of the hot plates. No direct heat is applied to the upper surface of the material until the press closes. As soon as the loaded caul sheets are put into the press, two things start happening in the compound. First, the resin on the hot side starts its reaction process and, second, moisture within the compound tends to migrate away from the hot side, only to condense on contact with the cooler particles in the mass of compound. Resin and resin covered particles without pressure to make the resin flow tend to stick to the caul. Uneven application of heat on opposite sides of the board causes moisture accumulation nearer to the side receiving the heat last, resulting in warpage of the sheet.

Boards formed by these conventional means are frequently run through sanding operations to remove surface blemishes caused by surface sticking which pulls out particles from the board surface, by erratic fines distribution and by uneven density. Not only is the surface of the board injured by sticking, but it becomes necessary to clean the cauls to remove the particles which have adhered thereto. In order to correct warpage, frequently the boards are run through an elaborate normalizing process in an attempt to offset the built-in warpage.

The objects of the present invention are: to provide an apparatus which will generally improve the product; materially reduce the initial cash outlay for plant construction; speed up the molding cycle; eliminate many parts of the apparatus presently employed in conventional systems; and to simplify the entire molding operation.

A feature of the present invention lies in the provision of a hydraulic molding press in which the heated platens are arranged in vertical planes and moveable, between open and closed position, in a horizontal direction, thereby obtaining gravity flow of the material throughout the entire cycle.

A further feature of the present invention lies in the provision of a system which eliminates the costly, complicated, and inaccurate "travel" method of caul loading. In so doing, the customary loading and unloading elevators may be entirely eliminated in favor of a much simpler construction. The apparatus also eliminates the cumbersome conventional mechanism for unloading the molded boards from the cauls, which usually involves tipping the cauls over and then righting them so that they can travel to position to be refilled.

A further feature of the present invention lies in the provision of a novel caul sheet arrangement in which two caul sheets are positioned between each pair of hot plates and form the actual molding cavity. These caul sheets are not removed from the press except for possible cleaning or repair, and accordingly are not subject to the normal handling hazards.

A further feature of the present invention resides in the provision of a novel means of gravity loading the molding compound between the caul sheets. A hopper containing the mixed molding compound is supported for vertical movement above the press and includes gates or doors directly above the openings in the press when the mold is in open position. By moving the hopper downwardly against the press and opening the doors closing the hopper outlets, the molding compound is permitted to drop by gravity between the caul plates, thereby filling the press entirely by gravity and without the necessity of employing other compound distributing means. Due to this vertical gravity loading, a uniform distribution of the fines within the aggregate is obtained, thus gaining uniform skin stress and uniform appearance on both sides of the board.

A further feature of the present invention pertains to the fact that the soft molding compounds, which tend to densify under static and kinetic pressures, are loaded between the caul sheets in a manner to compensate for the weight of the molding compound. In view of the fact that the molding compound near the bottom of the caul sheets is denser than the molding compound near the top of the caul sheets, due to the weight of the compound and the force of the compound dropping into the mold, the caul sheets are arranged to converge toward one another in the lower ends of the caul sheets. By adjusting the extent to which the sheets converge, a board of uniform density through its height may be produced.

A further feature of the present invention resides in the provision of a molding press having a series of hot plates arranged on vertical planes and pivotally suspending a pair of caul sheets between each adjacent pair of hot plates. These caul sheets are so supported as to be out of direct contact with the hot plate during the filling operation and until such time as pressure is applied. Until this time, such heat as reaches the cauls is applied equally to both sides of the mat. Two results are thus accomplished. The precure of the resin is minimized or eliminated entirely, and as heat is applied simultaneously and uniformly to both sides of the mat being molded, the moisture migrates to the mathematical center of the board, thereby eliminating warpage.

These and other objects and novel features of the present invention will be more clearly and fully set forth in the following specification and claims.

In the drawings forming a part of the specification:

FIGURE 1 is a diagrammatic sectional view through the board forming press, showing the press filling hopper and eliminating the molded board receiving and discharging mechanism.

FIGURE 2 is a side elevational view of a portion of the press showing the manner in which the caul plates are supported.

FIGURE 3 is a perspective view of a portion of the press showing the manner in which the caul plates are hinged.

FIGURE 4 is a diagrammatic sectional view through a portion of the press illustrating the board discharging mechanism.

FIGURE 5 is an enlarged sectional view through a portion of the press showing the manner in which the caul plates are positioned therein.

FIGURE 6 is a diagrammatic side elevational view showing the manner in which the hot plates are connected so that these plates will be evenly spaced when the press is in open position.

FIGURE 7 illustrates the means of limiting the separation of the lower ends of the caul plate in the open position of the press.

FIGURE 8 is a diagrammatic end view of the press.

FIGURE 9 is a horizontal sectional view through a portion of one of the hot plates and the adjoining caul plates.

In view of the fact that the apparatus involved in the present invention is of very considerable size, and in view of the fact that certain of the details of construction are unimportant to the operation of the device, most of the figures are diagrammatic. However, sufficient detail is believed illustrated so that the operation of the apparatus can be readily understood.

With reference first to FIGURES 1 and 4 of the drawings, the board forming apparatus includes a press which is designated in general by the letter A. The press A includes a pair of fixed upright bolster plates 10 and 11 which are connected together along opposite sides by large diameter shafts 12 and 13 which are held from axial movement by nuts 14 or other suitable means to hold the bolster plates from separation. A series of hot plates 15 are slidably supported on the shafts 12 and 13 and are movable longitudinally thereof. A movable platen 16 is also slidably supported upon the shaft 12 and 13 and movable axially thereof to force the hot plates toward one another or to separate the same. A series of cylinders 17 (FIGURE 8) are mounted upon the bolster plate 11 and extend therethrough in axially parallel relation. Flanges 19 on the cylinders 17 are anchored to the bolster plate 11 to hold the cylinders from an axial movement. Hydraulic plungers 20 are slidable in cylinders 17 and are moved axially thereof by hydraulic force. Pistons 21 (shown in FIGURE 4) are slidable in the cylinders to reciprocate the plungers 20. The hot plates could be similarly reciprocated by mechanical toggle means.

The plungers 20 extend into sockets 22 in the pressure plate 11 and are anchored to the pressure plates by bolts 23 or other suitable means. With this arrangement, the pressure plate is moved longitudinally on the supporting shafts 12 and 13 by the pistons 21 in the cylinders 17.

As indicated in FIGURE 6 of the drawings, a link 24 is pivotally connected to each hot plate 15 by suitable pivots 25, the hot plates preferably being similarly connected at each side and top and bottom of the hot plates. A pin 26 projects laterally from the next adjoining hot plate 15 and is slidable in a slot 27 in each link. An adjustment bolt is provided on each link 24 extending into the end of the slot 27 and engageable with the pins 26 in one extreme position of these pins. The links 24 act to slide the hot plates 15 apart upon movement of the pressure plate 16 to the right as viewed in the drawings. Thus all of the hot plates 15 are moved apart a predetermined distance in the open position of the press which is indicated in FIGURES 1 and 5 of the drawings.

The hot plates 15 are provided with passages 30 extending therethrough providing a conduit for steam or other heating fluid. Steam or another heating fluid is forced through the hot plate to maintain them at a predetermined temperature capable of curing the resinous substance being molded. Electric heating elements may also be used.

A pair of flexible caul plates 31 and 32 which are thin relative to the thickness of the hot plates are suspended between each adjacent pair of hot plates 15. As indicated in FIGURES 2 and 3 of the drawings, a T-shaped support 33 is provided with a horizontal cross flange 34 secured to the upper edge of each hot plate 15 and includes a vertical flange 35 extending transversely of the hot plate and intermediate the opposed vertical surfaces thereof. The caul plates 31 and 32 on opposite sides of each hot plate are provided with upwardly converging upper end portions 36 and 37 which terminate in hook ends 39 and 40 which are designed to hook over the upper edge of the flange 35. As is indicated in FIGURE 3 of the drawings, the inclined portions 36 and hook ends 39 of the cauls 31 are notched as indicated at 41, the notches 41 alternating with the hook end portions 39. The inclined portions 37 and hook ends 40 are similarly notched as indicated at 42, the notches 42 registering with the hook ends 39, and the hook ends 40 registering with the notches 41, so that both of the caul plates may be hingedly connected to the upper edge of the flange 35 of the T-shaped support 33. This arrangement is provided so that the caul plate may be readily removed for cleaning or for replacement by merely unhooking the caul plates from the support 33. As is best indicated in FIGURE 9 of the drawings, each hot plate 15 is provided with a series of spaced T-shaped grooves in their opposed vertical surfaces 43 and 44, the grooves being indicated in general by the numerals 45 and 46. The grooves 45 and 46 each include a central groove portion 47 which extends at right angles to the vertical surface of the hot plate and a wide relatively shallow portion 49 on either side of the central portion 47. The inner surfaces of the caul plates 31 and 32 are provided with vertical T-shaped reinforcing members indicated in general by the numerals 50 and 51 and which are secured to the surface of the caul sheets or plates by rivets 52 which extend through the base flanges 53 of the reinforcing members 50 and 51. The flanges 53 are of proper dimensions to fit into the shallow portions 49 of the grooves 45 and 46. A right angular flange 54 on each of the T-shaped reinforcing members is designed to extend into the central portions 47 of the grooves. As a result of this arrangement, the T-shaped reinforcing members 50 and 51 will be recessed into the hot plates 15 as caul plates 31 and 32 are pressed into contact with the surface of the hot plates in a manner which will be later described. The reinforcing bars are provided at intervals throughout the width of the caul plates and hold the caul plates from buckling or bending during the filling operation.

As indicated in FIGURE 7 of the drawings, the separation of the lower ends of the caul plates 31 and 32 is regulated by links 55 which are pivotally connected as at 56 to opposite ends of one of the caul plates such as the caul plate 31. A pin 57 projecting from the opposite sides of the caul plate 32 is slidable in a slot 59 of a corresponding link 55. A set screw 60 extends into the end of each link 55 and is engageable with the pin 57 to limit the travel of the pin 57 in the slot 59.

As is also diagrammatically illustrated in FIGURE 7, a bottom closure plate 61 is pivotally connected at 62 to the lower end of the caul sheet or plate 32 and is pivotal between an open and a closed position. Any suitable means may be provided for opening the bottom closure plate. In the particular arrangement illustrated, each closure plate 61 is provided with an operating lever 63 which is pivotal in unison therewith. An operating arm 64 is pivotally connected to the lever at 65 and may be actuated by a fluid cylinder 66 or other suitable means.

With reference now to FIGURES 1 and 5 of the drawings, a hopper 67 is filled to a suitable level with mixed molding compound indicated by the letter B. A filling opening 69 or a series of such filling openings is provided. The hopper 67 is shown as being generally rectangular in shape having end walls 71 and connected side walls 70. The hopper preferably includes a top closure 72 through which the filling opening 69 extends. The hopper 67 is vertically slidable on guide tracks 73 and is vertically movable toward or away from the press by means illustrated in the drawings. The bottom 74 of the hopper is provided with a series of discharge openings 75 which are defined by downwardly converging wall portions 76 and 77. The discharge openings 75 are normally closed by closure plates 79 of any suitable type, the closure plates being pivotally connected to the lower end of the wall 77 as indicated at 80. Each closing plate is provided with some means of operating the closure such as a lever 81 pivotal with the closure. An operating rod 82 is pivotally connected as at 83 to the various levers 81 so that by operation of the operating rod 82 all of the closures may be simultaneously opened. Rotary agitators such as 84 are provided above each discharge opening to prevent cavitation over the discharge opening and to insure proper filling of each of the molds.

As indicated in the figures, the hopper 67 is lowered until the bottom 74 is in sealing relation with the T-shaped supports 33 thus providing a dust seal between the interior and the exterior of the molds during the filling operation.

With reference now to FIGURE 4 of the drawings, a shoot conveyor 85 is supported beneath the press for movement in a direction parallel to the shafts 12 and 13. This shoot conveyor 85 is provided with a closed top 86, side walls 87, a front wall 89 and a rear wall 90. The rear wall 90 is transversely slotted to accommodate a series of rollers 91 which project inwardly of the inner surface of the rear wall 90. A series of conveyor rollers 92 extend between the side walls 87 along an arcuate path tending to direct a molded board C downwardly and forwardly.

The top wall 86 is provided with a slot 93 extending from one side 87 to the other. When the slot 93 is in registry with the space between the caul plates 31 and 32 of each mold, the board C will pass through the open closure 61 and into the shoot conveyor, and be guided by the shoot conveyors onto the horizontal conveyor 94. The conveyor 94 is provided with depressible lugs 95 which may engage the boards C and convey them to their finished position.

The operation of the apparatus is believed clear from the foregoing description. With the press A in open position, the hopper 67 is lowered so that the bottom 74 thereof is in sealing relation with the upper ends of the supports 33 on top of each of the hot plates 15. While the agitators 84 are in operation, the closure plates 79 are opened, permitting the molding compound to drop by gravity between the caul plates. The molding compound has a tendency to bow the caul plates outwardly, but this is resisted by the connecting links 55 connecting the caul plates between each pair of hot plates.

When the mold cavities between the caul plates are filled, the closure plates 79 are closed and the hopper 67 is elevated above the press. Due to the edge loading of the molds, there is little chance for the fines to sift downwardly through the molding compound. Due to the fact that the caul plates are out of direct contact with the hot plates during the filling of the molds, the pre-curing of the molding power is held to a minimum. The heat which is transmitted to the caul plate is equal on both of the plates, and accordingly any tendency for the moisture to be driven from the heated surface will drive the moisture equally and uniformly to the center of the mass to be molded.

The pistons 21 in the cylinder 17 then act to move the pressure plate 16 to the left as viewed in the drawings, moving the hot plates toward one another. This action compacts the molding compound and forces caul plates into surface contact with the hot plate, thus transmitting heat and pressure to the molding compounds and acting to cure the board in the various molds. Due to the fact that the weight of the column of molding compound makes the compound at the lower ends of the molds more dense, the molding compounds at the upper ends of the molds are compacted to a somewhat greater extent due to the downwardly converging relation of the caul plates. While the taper of the caul plate in the mold is illustrated in exaggerated form, the distance between the lower edges on the caul plates is sufficiently less than the distance between the upper edges thereof to compensate for the greater density of the molding compound at the bottom of the mold.

In preferred form, the caul plates 31 and 32 have their inner opposed surfaces slightly convex, the convexity being on the order of one-quarter of an inch in four feet. This causes the reinforcing members to more effectively prevent the outward bowing of the cauls by the pressure of the molding compound therebetween.

When the molding operation is completed, the movement of the piston 17 in the cylinders is reversed and the pressure plate 16 is moved to the right toward the bolster plate 11. This action acts through the various links 24 to slide the hot plates 15 into properly spaced relation. Just before the mold is opened, the bottom closure plates 61 are opened. Accordingly, when the mold is opened, the molded boards are free to drop down upon the upper surface 86 of the shoot conveyor. With the slots 93 between the closure plate 61 of the mold cavity nearest the pressure plate 16, the molded board in this cavity may drop through the opening 93 and be directed onto the conveyor 94. As the shoot conveyor 87 is moved to the left, the slot 93 successively passes beneath the various mold cavities and the boards contained therein drop downwardly. As the finished boards C are removed from the press, the bottom closure plates 61 are again closed, the shoot conveyor 85 returns to its starting position, and the hopper 67 may again be lowered to start the new cycle of operation.

The body of the press, excluding the specific filling mechanism, could similarly be used for securing plies of plywood together. The plies with the adhesive compound therebetween, may be fed between the caul sheets in proper relation, and the press closed to bond the sheets. The formed sheets may be discharged in the manner described. Thus the apparatus is described in the claims as an apparatus for molding boards and the like, to include the bonding of the plies together.

In accordance with the patent statutes, I have described the principles of construction and operation of my improvement in method and apparatus for molding low cost molding compounds, and while I have endeavored to set forth the best embodiment thereof, I desire to have it understood that changes may be made within the scope of the following claims without departing from the spirit of my invention.

I claim:

1. An apparatus for molding boards and the like including a series of hot plates having opposed surfaces arranged in generally vertical parallel planes, means supporting said hot plates for movement in a generally horizontal direction toward and away from one another, relatively thin and flexible metal caul sheets arranged in pairs between said hot plates, means above said hot plates supporting said caul sheets, said caul sheets, when press is open, being closer together near their lower ends than near their upper ends, means engaging the lower ends of said caul sheets to limit separation of said caul sheets to a distance less than the distance between said hot plates when the same are moved apart, means for directing molding compound between said caul sheets, said last named means comprising hopper means, and means supporting said hopper means for vertical reciprocation toward and away from said hot plates.

2. An apparatus for molding boards and the like including a mold comprising a series of hot plates having opposed surfaces arranged in generally vertical planes, means supporting said hot plates for movement in a generally horizontal direction toward and away from one another to close and open the mold, relatively thin caul sheets arranged in pairs between said hot plates, means at the top of said hot plates supporting said caul sheets, means engageable with the lower ends of said caul sheets for limiting separation therebetween to a distance less than the distance between said hot plates in open position of said mold, and releasable means supported by one caul plate of each pair to close the space between said caul sheets at the lower ends thereof.

3. The structure of claim 1 and including means beneath said hot plates for releasably supporting boards and the like molded between said caul sheets and for releasing said boards and the like one at a time from between said caul sheets by gravity.

4. The structure of claim 1 and in which the inner opposed surfaces of said caul sheets are slightly convex.

5. The structure of claim 2 and including a support movably mounted beneath said hot plates, and means for moving said support to permit the molded boards and the like to drop by gravity one at a time.

6. An apparatus for molding boards and the like comprising a press including a series of hot plates having opposed surfaces arranged in generally vertical parallel planes, means supporting said hot plates for movement in a generally horizontal direction perpendicular to the opposed surfaces and toward and away from one another, means for forcing said plates together to close the press, flexible metal caul sheets arranged in pairs between said hot plates, the surfaces of said sheets being generally free of direct face contact with said hot plates when said plates are moved apart, means at the top of said hot plates supporting said caul sheets, means holding said caul sheets, closer together at their lower ends than at their upper ends when the press is open, means providing a bottom closure for the space between said caul sheets, said caul sheets flexing against said hot plates when said press is closed.

7. An apparatus for molding boards and the like comprising a press including a series of hot plates having opposed surfaces arranged in generally vertical parallel planes, means supporting said hot plates for movement in a generally horizontal direction perpendicular to the opposed surfaces and toward and away from one another, means for forcing said plates together to close the press, metal caul sheets arranged in pairs between the hot plates, the surfaces of said sheets being generally free of direct face contact with said hot plates when said plates are moved apart, means at the top of said hot plates pivotally supporting said caul sheets, means holding said caul sheets closer together at their lower ends than at their upper ends when the press is open, means providing a bottom closure for the space between said caul sheets, said caul sheets pivoting against said hot plates when said press is closed.

8. The structure of claim 7 and including reinforcing members secured to the outer surface of said caul sheets, and grooves in said hot plates into which said reinforcing members extend when said hot plates are moved toward one another.

9. An apparatus for molding boards and the like comprising a press including a series of hot plates having opposed surfaces arranged in generally parallel vertical planes, means supporting said hot plates for movement in a generally horizontal direction toward and away from one another, means for forcing said plates together and for drawing them apart, flexible metal caul sheets arranged in pairs between said hot plates, means above said hot plates supporting said caul sheets, means holding said caul sheets closer together at their lower ends than at their upper ends when the press is open, means providing a bottom closure for the space between said sheets to a distance less than the distance between said hot plates when the same are moved apart and means for directing molding compound between said caul sheets.

10. An apparatus for molding boards and the like comprising a press including a series of hot plates having opposed surfaces arranged in generally vertical parallel planes, means supporting said hot plates for movement in a generally horizontal direction toward and away from one another, means for forcing said plates together and drawing them apart, relatively thin and flexible caul sheets of material of high heat conductivity arranged in pairs between said hot plates, said caul sheets, when press is open, being closer together near their lower ends than near their upper ends, means engaging the lower ends of said caul sheets to limit separation therebetween, said caul sheets having hook shaped upper ends, means adjoining the lower ends of said caul sheets to form a bottom closure for the space between said caul sheets, and means at the upper ends of said hot plates for supporting said hook ends to pivotally suspend said caul sheets.

11. An apparatus for molding boards and the like comprising a press including a series of hot plates having opposed surfaces arranged in generally vertical parallel planes, means supporting said hot plates for movement in a generally horizontal direction toward and away from one another, means for forcing said plates together and drawing them apart, relatively thin and flexible caul sheets of material of high heat conductivity arranged in pairs between said hot plates, means at the upper ends of said hot plates supporting the caul sheets, said caul sheets, when the press is open, being close together near their lower ends than near their upper ends, means engaging the lower ends of said caul sheets to limit separation therebetween, means forming a bottom closure for the space between said caul sheets, said caul sheets including spaced upright reinforcing members on the outer surfaces of said caul sheets, and grooves in said hot plates designed to accommodate said reinforcing members.

References Cited in the file of this patent

UNITED STATES PATENTS

| | | |
|---|---|---|
| 538,687 | Lelardoux | May 7, 1895 |
| 1,317,354 | Crawford | Sept. 30, 1919 |
| 1,973,786 | Wilhelm | Sept. 18, 1934 |
| 2,420,813 | Camerota | May 20, 1947 |
| 2,487,233 | Gerke | Nov. 8, 1949 |
| 2,550,687 | Goss | May 1, 1951 |
| 2,596,602 | Roddenberry | May 13, 1952 |
| 2,631,381 | Burrows | Mar. 17, 1953 |
| 2,708,288 | Fuller et al. | May 17, 1955 |